US012356356B2

(12) United States Patent
Goel et al.

(10) Patent No.: US 12,356,356 B2
(45) Date of Patent: Jul. 8, 2025

(54) GEOGRAPHICALLY INTELLIGENT NETWORK FUNCTION REQUEST ROUTING

(71) Applicant: Oracle International Corporation, Redwood City, CA (US)

(72) Inventors: Yesh Goel, Bengaluru (IN); Ahmed Akl, Little Elm, TX (US)

(73) Assignee: Oracle International Corporation, Redwood City, CA (US)

( * ) Notice: Subject to any disclaimer, the term of this patent is extended or adjusted under 35 U.S.C. 154(b) by 399 days.

(21) Appl. No.: 18/066,025

(22) Filed: Dec. 14, 2022

(65) Prior Publication Data

US 2024/0205862 A1 Jun. 20, 2024

(51) Int. Cl.
*H04W 60/04* (2009.01)
*H04W 48/08* (2009.01)
*H04W 48/16* (2009.01)

(52) U.S. Cl.
CPC ........... *H04W 60/04* (2013.01); *H04W 48/08* (2013.01); *H04W 48/16* (2013.01)

(58) Field of Classification Search
None
See application file for complete search history.

(56) References Cited

U.S. PATENT DOCUMENTS

| | | |
|---|---|---|
| 10,616,934 B2 | 4/2020 | Talebi Fard et al. |
| 11,265,808 B2 | 3/2022 | Wang |
| 11,271,846 B2 | 3/2022 | Krishan |
| 11,405,861 B2 | 8/2022 | Regnault et al. |
| 11,558,732 B1 | 1/2023 | Malhotra et al. |
| 2019/0053010 A1 | 2/2019 | Edge et al. |
| 2019/0230556 A1 | 7/2019 | Lee |
| 2020/0127916 A1* | 4/2020 | Krishan ............... H04L 45/121 |
| 2020/0260371 A1 | 8/2020 | Wang |
| 2020/0296606 A1* | 9/2020 | Mendoza ............... H04L 41/12 |
| 2020/0314672 A1 | 10/2020 | Farooq |
| 2020/0367148 A1 | 11/2020 | Baek et al. |
| 2021/0014680 A1 | 1/2021 | Saarinen et al. |
| 2021/0084508 A1 | 3/2021 | Mendoza et al. |
| 2021/0297935 A1 | 9/2021 | Belling et al. |
| 2021/0385734 A1 | 12/2021 | Keller et al. |
| 2022/0045991 A1 | 2/2022 | Khare et al. |
| 2022/0225075 A1 | 7/2022 | Shao |

* cited by examiner

*Primary Examiner* — Walter J Divito (57) ABSTRACT

A regional NRF may register NFs, and the registration information may include locality information for each registered NF. During synchronization with a root NRF, the regional NRF provides the locality information for each registered NF. During discovery request routing by the root NRF, the root NRF prioritizes regional NRFs having NFs that satisfy the discovery parameters of the discovery request and match the preferred locality indicated in the discovery request.

20 Claims, 7 Drawing Sheets

| Fields | Type | Cardinality | Description |
|---|---|---|---|
| ... | ... | ... | ... |
| nfProfileInfoList | Map(CustomInfo) | 0..N | Map of CustomInfo where NF Instance Id attribute in NF Profile shall be taken as key of the map. |
| ... | ... | ... | ... |

GEOGRAPHICALLY INTELLIGENT NETWORK FUNCTION REQUEST ROUTING

BACKGROUND

In a wireless network, network functions (NFs) serve to provide functionality to the various components and user equipment used on the wireless network. For example, network functions perform tasks such as session management (e.g., session management function (SMF)), policy control (e.g., policy control function (PCF)), access and mobility (e.g., access and mobility management function (AMF)), and so forth. The computing systems that provide these functions are located throughout the geographic area that the wireless network supports. Regional network repository functions (NRFs) are geographically located to handle various localities in a region, and the NFs register with the relevant geographically located regional NRFs for providing the NF information in response to discovery requests.

Root NRFs are located such that many regional NRFs may register and synchronize with a root NRF so when a discovery request is not handled by a regional NRF, it can be forwarded to the root NRF that the regional NRF is registered with for rerouting. However, current technologies do not account for the geographic location of NFs when rerouting by root NRFs. Accordingly, improvements in geographic routing by root NRFs are needed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for routing network function (NF) requests by a root network repository function (NRF). The method may be performed by a root NRF and may include the root NRF syncing a number of regional NRFs each having registration information for a respective set of NFs including a locality value for each NF. The root NRF may receive, from the first regional NRF, a discovery request including discovery parameters and a preferred locality parameter. In response to determining that a number of NFs registered with a second regional NRF satisfy the discovery parameters and have a same locality value as the preferred locality parameter, forward the discovery request to the second regional NRF. Other embodiments of this aspect include corresponding computer systems, apparatus, and computer programs recorded on one or more computer storage devices, each configured to perform the actions of the methods.

Implementations may include one or more of the following features. The method may include the root NRF determining a second number of NFs registered with a third regional NRF that satisfy the discovery parameters and have the same locality value as the preferred locality parameter, where forwarding the discovery request to the second regional NRF is further in response to determining the number of NFs registered with the second regional NRF is larger than the second number of NFs registered with the third regional NRF. Optionally, the method may include the root NRF receiving an indication from the second regional NRF that the discovery request failed and forwarding the discovery request to the third regional NRF. In some embodiments, the syncing the regional NRFs may include receiving a synchronization request from each regional NRF and storing the registration information for the NFs including the locality value for each NF. In some embodiments, the first regional NRF, the second regional NRF, and the root NRF each support a 5G core network. In some embodiments, the syncing the second regional NRF may include receiving the locality value for each NF as a CustomInfo structure embedded within an <nftype>InfoStructure message. In some embodiments, syncing the second regional NRF may include receiving the locality value for each NF as a CustomInfo structure embedded within a Map message. In some embodiments, the root NRF may further determine a locality set triplet that includes a primary set of locality values, a secondary set of locality values, and a tertiary set of locality values, and where the number of NFs in the second set of NFs have a locality value matching values in the primary set of locality values. In some embodiments, the root NRF may prioritize the regional NRFs based on an attribute, and the root NRF forwarding the discovery request to the second regional NRF is further based on a priority of the second regional NRF. In some embodiments, the root NRF may further determine a locality set triplet that includes a primary set of locality values, a secondary set of locality values, and the root NRF may receive an indication from the second regional NRF that the discovery request failed. The root NRF may reroute the discovery request to a third regional NRF based on hierarchically evaluating the plurality of regional NRFs for a number of NFs having a locality value matching values in the primary set of locality values, matching values in the secondary set of locality values, and matching values in the tertiary set of locality values. Implementations of the described techniques may include hardware, a method or process, or computer software on a computer-accessible medium.

Another general aspect includes a regional network repository function (NRF) system for syncing network function (NF) locality information to a root NRF. The regional NRF system includes one or more processors and a memory with instructions that, upon execution by the one or more processors, cause the one or more processors to perform functions. The regional NRF system may receive a registration request from each NF of a number of NFs, where the registration request includes registration information including a locality value for the respective NF. The regional NRF may store the registration information for each NF and transmit the registration information including the locality value for each NF to the root NRF. Other embodiments of this aspect include corresponding computer systems, apparatus, and computer programs recorded on one or more computer storage devices, each configured to perform the actions of the methods.

Implementations of this aspect may include one or more of the following features. In some embodiments, the regional NRF system may embed the locality value for each NF as a CustomInfo structure within an <nftype>InfoStructure message for transmitting to the root NRF. In some embodiments, the regional NRF system may embed the locality value as a CustomInfo structure within a Map message for transmitting to the root NRF. In some embodiments, the regional NRF system supports a 5G core network. Implementations of the described techniques may include hardware, a method or process, or computer software on a computer-accessible medium.

Another general aspect includes a root network repository function (NRF) system. The root NRF includes one or more processors and a memory with instructions that, upon execution by the one or more processors, cause the one or more processors to perform functions. The functions include the root NRF receives a synchronization request from each of a number of regional NRFs, where each synchronization request includes registration information for a respective set of NFs registered with the respective regional NRF, and the registration information may include a locality value for each NF. The root NRF stores the registration information for each of the regional NRFs including the locality value for each NF. Other embodiments of this aspect include corresponding computer systems, apparatus, and computer programs recorded on one or more computer storage devices, each configured to perform the actions of the methods.

Implementations may include one or more of the following features. In some embodiments, the root NRF receives a discovery request that includes discovery parameters and a preferred locality parameter from a first regional NRF, identifies a second regional NRF based on the second regional NRF having a highest number of registered NFs that satisfy the discovery parameters and having the locality value matching the preferred locality parameter, and forwards the discovery request to the second regional NRF. In some embodiments, the root NRF receives an indication that the second regional NRF cannot complete the discovery request, identifies a third regional NRF based on the third regional NRF having a second highest number of registered NFs that satisfy the discovery parameters and having the locality value matching the preferred locality parameter, and forwards the discovery request to the third regional NRF. In some embodiments, the root NRF may receive a discovery request that includes discovery parameters and a preferred locality parameter from a first regional NRF. The root NRF may determine a locality set triplet based on the preferred locality parameter, where the locality set triplet includes a primary set of locality values, a secondary set of locality values, and a tertiary set of locality values. The root NRF may route the discovery request to a second regional NRF based on hierarchically evaluating the regional NRFs for a number of NFs that satisfy the discovery parameters and having a locality value matching values in the primary set of locality values, matching values in the secondary set of locality values, and matching values in the tertiary set of locality values. In some embodiments, the root NRF may receive a discovery request that includes discovery parameters and a preferred locality parameter from a first regional NRF, prioritize the regional NRFs based on an attribute, and route the discovery request to a second regional NRF based on the prioritization and a determination that the second regional NRF has a highest number of registered NFs that satisfy the discovery parameters and having the locality value matching the preferred locality parameter. In some embodiments, the root NRF system supports a 5G core network. Implementations of the described techniques may include hardware, a method or process, or computer software on a computer-accessible medium.

DETAILED DESCRIPTION

In wireless communication networks, various network functions (NFs) are provided to perform functionality used within the network. For example, session management, policy control, and the like are types of functionalities that can be performed by NFs such as a session management function (SMF) and a policy control function (PCF). The computing systems that serve these functions are located in various geographic areas, and many different computing systems may provide the same functions. The NFs register with regional network repository functions (NRFs), and the NRFs return NF information when a discovery request is received for a given type of NF.

When a NF registers with the regional NRF, the NF includes locality information specifying their location (e.g., geographic location, data center). The regional NRF stores the locality information for the NFs upon registration. An NF that needs the assistance of another NF to provide functionality is a consumer NF. The NF that assists is a producer NF. Consumer NFs may send discovery requests to regional NRFs to request information for a producer NF. The discovery requests may include discovery parameters to indicate the type of NF needed and other information. The consumer NF may also use a "preferred-locality" parameter in the discovery request to indicate a preferred location of the producer NF. When the regional NRF receives the discovery request from the consumer NF, the regional NRF may provide a response that includes producer NFs that match the discovery parameters of the discovery request and may order or prioritize the matching producer NFs based on the preferred-locality parameter, giving higher priority to the producer NFs that match the preferred-locality.

Root NRFs are located such that many regional NRFs may register and synchronize with the root NRF. If a regional NRF is unable to handle a discovery request, the regional NRF forwards the discovery request to the root NRF for rerouting to a different regional NRF. In prior systems, the information synchronized with root NRFs did not include locality information. Accordingly, root NRFs have not historically used location information to reroute discovery requests.

The present disclosure provides systems and methods for rerouting discovery requests with geographic intelligence. In one aspect, the regional NRFs synchronize the location information provided in the NF registration with the root NRF. When a root NRF receives a discovery request from a regional NRF, the root NRF can select a regional NRF that has NFs matching the preferred locality indicated in the discovery request.

The present technology provides technical improvements over existing systems. The geographically intelligent rerouting reduces the resources needed to serve the discovery requests. Using geographically close NFs reduces the time needed to process requests and the data bandwidth over the network, thereby reducing processor cycles of the components in the system. For example, the consuming NF processor cycles spent waiting for responses will be fewer.

Figure 1:
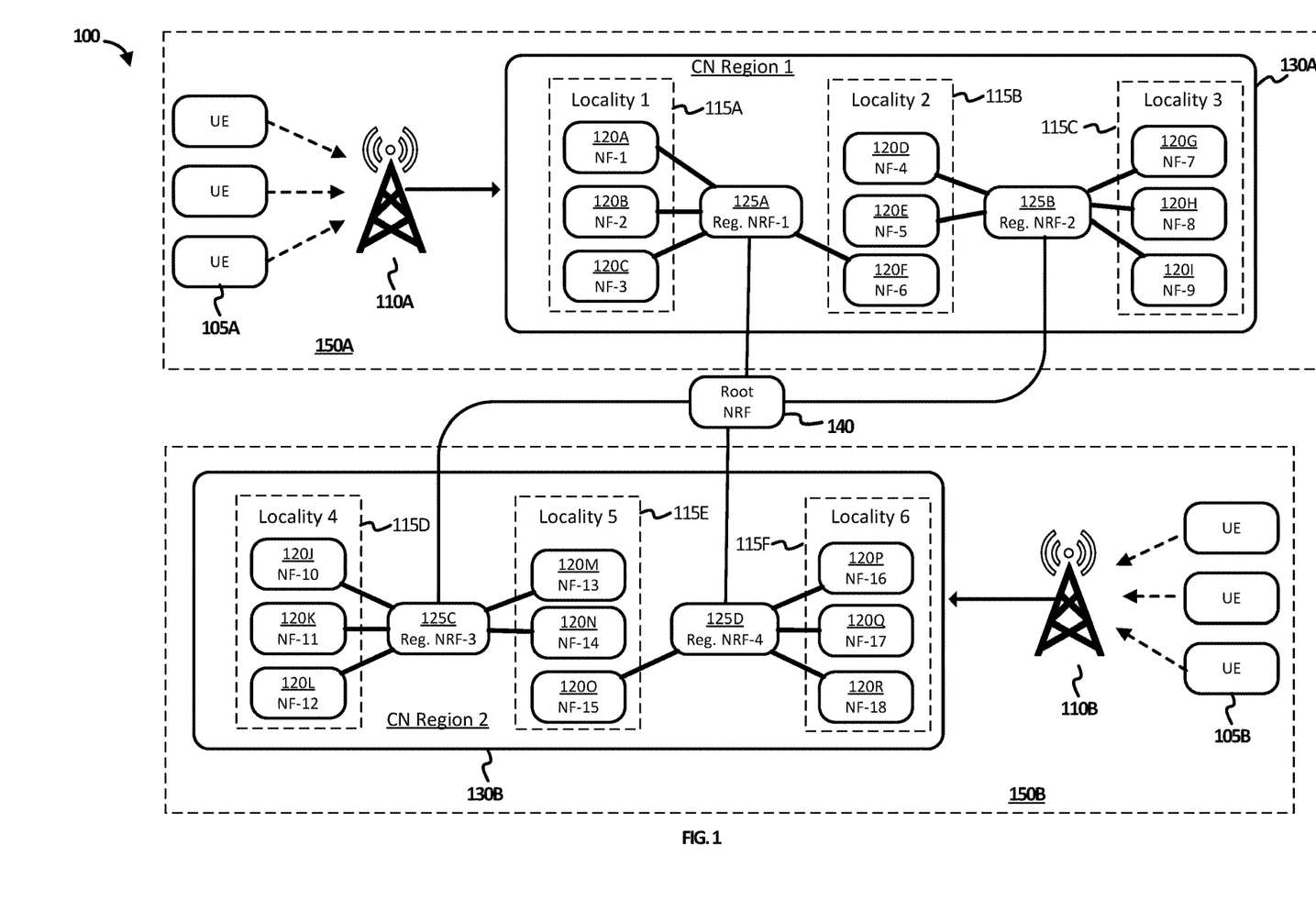
FIG. 1 illustrates an exemplary network for implementing geographically intelligent NF request routing, according to some embodiments.

Turning now to the figures, FIG. 1 depicts an exemplary high-level illustration of a wireless network 100. The wireless network 100 includes a first region 150A, a second region 150B, and a Root Network Repository Function (Root NRF) 140. While FIG. 1 shows two regions by way of example, the wireless network 100 may include more or fewer regions. Further, while a single Root NRF 140 is shown for simplicity and ease of description, many root NRFs 140 may exist. In some embodiments, more than one Root NRF 140 may service the same regional NRFs 150 (e.g., to provide redundancy and/or load balancing). In some embodiments, there are multiple root NRFs 140 that each service a number of regional NRFs 150 that may or may not overlap. The Root NRFs 140 may be regionally located, and the regional NRFs 150 may register with Root NRFs 140 that are located nearby.

Each region 150 includes User Equipment (UE) 105; an access point 110; and a Core Network (CN) region 130. Specifically, the first region 150A includes UE 105A, access point 110A, and a first CN region 130A. The second region 150B includes UE 105B, access point 110B, and a second CN region 130B.

The User Equipment (UE) 105 in each region 150 includes devices used by end-users to communicate via the wireless network 100. The User Equipment 105 may include any computing device having the circuitry capable of wirelessly connecting on wireless network 100 including, for example, smart watches, cell phones, tablets, laptops, Internet of Things devices, and the like. Although three UEs 105 are shown in each region 150, any number of UE 105 may be included in each region 150. Further, more or fewer UE 105 may be in the first region 150A than in the second region 150B.

The access point 110 in each region provides access for each UE 105 to connect to wireless network 100. Access point 130 may each consist of one or more base stations (e.g., radio access point or wireless access point) including, for example and without limitation, eNodeB, gNodeB, base transceiver station (BTS), base station controller (BSC), radio network controller (RNC), NodeB or the like. The access point 110 is configured to control reception and transmission of signals with the UE 105, to process signals from UE 105, and to communicate with the CN regions 130, among other functions.

The CN regions 130 are virtual regions based on geographic location. In other words, the CN region 130A is a virtual or logical construct that is based on geographic location. The CN regions 130 include localities 115, NFs 120, and regional NRFs 125. While two CN regions 130 are shown, wireless network 100 may include more or fewer CN regions 130. Together, CN regions 130A and 130B perform various functions for the operation of wireless network 100. While some functions are discussed herein, the CN regions may provide many more functions not described for simplicity.

The first CN region 130A includes NFs 120A-120I. The second CN region 130B includes NFs 120J-120R. While each CN region 130 shows a number of NFs 120, each CN region 130 may include more or fewer NFs 120. The NFs 120 may be consumer and/or producer NFs. For example, if the NF needs assistance from another NF, for the purposes of that situation, the NF is a consumer NF. Similarly, if the NF is assisting or providing functionality to another NF, the assisting NF is a producer NF for the purposes of that situation. Any NF 120 may be a consumer NF sometimes and a producer NF other times. The NFs 120 provide network functionality including, for example, policy control (policy control function (PCF)), session management (Session Management Function (SMF)), access and mobility management (Access and Mobility Management Function (AMF)), data management (Unified Data Management Function (UDM)) and the like. NFs 120 may all be the same type of NF (e.g., all SMFs, all PCFs, all AMFs, etc.) or they may be different types of NF (e.g., some SMFs, some AMFs, and some PCFs, for example). The NFs 120 are served by computing systems that perform the functions offered by each NF 120.

Each NF 120 includes location information for the locality 115 in which they are geographically located. For example, NFs 120A, 120B, 120C are each in a first locality 115A and therefore each have a same locality value. Similarly, NFs 120D, 120E, 120F are each in a second locality 115B, NFs 120G, 120H, 120I are each in a third locality 115C, NFs 120J, 120K. 120L are each in a fourth locality 115D, NFs 120M, 120N, 120O are each in a fifth locality 115E, and NFs 120P. 120Q, 120R are each in a sixth locality 115F. The localities 115 are locational designations based on a geographic location. Each locality 115 may represent, for example, a data center with computing systems performing core network operations including the NFs 120. Each data center may operate from a distinct geographical location (i.e., locality). In some examples, there may be overlap between regions 150, and one locality 115 may be situated in two different CN regions 130. While three NFs 120 are shown in each locality 115, any number of NFs 120 may be in each locality 115.

Each CN region 130 includes regional network repository functions (NRFs) 125. The first CN region 130A includes regional NRF 125A and regional NRF 125B. The second CN region 130B includes regional NRF 125C and regional NRF 125D. While each CN region 130 is shown with two regional NRFs 125, more or fewer regional NRFs 125 may be included in each CN region 130. The regional NRFs 125 may be served by computing systems in data centers, such as the data centers that may provide the NFs 120.

Each regional NRF 125 is a repository for information about specific NFs operating in its respective CN region 130. The NFs 120 register with a relevant regional NRF 125. When registering, each NF 120 provides locality information to the regional NRF 125. For example, NFs 120A, 120B, 120C, and 120F register with first regional NRF 125A, and NFs 120A, 120B, and 120C provide first locality 115A information, while NF 120F provides second locality 115B information. NFs 120D and 120E register with second regional NRF 125B and provide second locality 115B information, and NFs, 120G, 120H, and 120I register with second regional NRF 125 and provide third locality 115C information. NFs 120J, 120K, and 120L register with third regional NRF 125C and provide fourth locality 115D information, and NFs 120M and 120N register with third regional NRF 125C and provide fifth locality 115E information. Finally, in the example shown, NF 120O registers with fourth regional NRF 125D and provides fifth locality 115E information, and NFs 120P, 120Q, and 120R register with fourth regional NRF 125D and provide sixth locality 115F information.

Root NRF 140 is a NRF to which the regional NRFs 125 synchronize. Root NRF 140 may otherwise be known as an intermediate forwarding NRF. While one Root NRF 140 is depicted for ease of description, many root NRFs 140 may exist in wireless network 100. For example, Root NRFs 140 may service regional NRFs 150 that are located nearby, so multiple Root NRFs 140 may be located throughout the service area of wireless network 100. Further, multiple Root NRFs 140 may service the same regional NRFs 150 to provide backup service, load balancing, redundancy, or the like. Root NRF 140 serves as a repository for information about NFs 120A-120R in both CN regions 130. Other regional NRFs may also synchronize to Root NRF 140, but the depiction is limited for simplicity. Each regional NRF 125 transmits the information for each NF 120 registered with the regional NRF 125 to root NRF 140 and keeps the information synchronized and updated. As described in more detail below, the locality (i.e., location information) for each NF 120 is included in the synchronization and transmitted to Root NRF 140. Additionally, Root NRF 140 may include a locality set triplet mapping. The mapping may include, for each preferred locality value, a preferred locality set triplet, which is a set of locations grouped in primary, secondary, and tertiary buckets. For example, a preferred locality of "fifth locality 115E" may have a mapping to a grouping of primary locality values including, for example, "fifth locality 115E" and "sixth locality 115F." "Fifth locality 115E" may have a mapping to a grouping of secondary locality values including, for example, "fourth locality 115D" and "first locality 115A." "Fifth locality 115E" may also have a mapping to a grouping of tertiary locality values including, for example, "second locality 115B" and "third locality 115C." Therefore, when a discovery request having a preferred locality of "fifth locality 115E" arrives, Root NRF 140 may utilize the mapping to identify other localities that are still considered primary localities for the preferred locality selected as well as others that are secondary and tertiary. Each mapping may have more or fewer localities in each of the primary, secondary, and tertiary buckets. This mapping allows Root NRF 140 to intelligently route discovery requests based on location by hierarchically evaluating the NFs registered with regional NRFs as described in more detail below.

Accordingly, in the example shown, first regional NRF 125A forwards the information about NFs 120A, 120B, 120C, and 120F to Root NRF 140. Second regional NRF 125B forwards the information about NFs 120D, 120E, 120G, 120H, and 120I to Root NRF 140. Third regional NRF 125C forwards the information about NFs 120J, 120K, 120L, 120M, and 120N to Root NRF 140. Fourth regional NRF 125D forwards the information about NFs 120O, 120P, 120Q, and 120R to Root NRF 140. In each of these cases, the information forwarded by the regional NRFs 125 to Root NRF 140 includes the location information (i.e., locality 115) for each of the respective NFs 120. Root NRF 140 stores the information about the NFs 120 forwarded by the regional NRFs 125 and uses the information for routing discovery requests.

Advantageously, as an improvement over previous solutions, the regional NRFs 125 forward the location information of the NFs 120 to Root NRF 140. Subsequently, Root NRF 140 may use the location information to intelligently route discovery requests between regional NRFs 125 to regional NRFs 125 having NFs 120 that meet the locality preference indicated in the discovery request.

In use, each NF 120 sends a registration request to a regional NRF 125 located in its respective CN region 130. For example, NF 120A sends a registration request to first regional NRF 125A, and NF 120J sends a registration request to third regional NRF 125C. The registration requests include the locality 115 of each respective NF 120, as well as other information such as the function performed (e.g., session management, policy control, or the like), the capacity of the NF 120, and so forth. In response to the registration requests, the regional NRFs 125 store the information received from the NFs 120. Regional NRFs 125 use the stored registration information to route discovery requests.

Regional NRFs 125 send a synchronization request to Root NRF 140 to synchronize data between the regional NRFs 125 and Root NRF 140. To complete synchronization, each regional NRF 125 forwards the information about the NFs 120 registered with the regional NRF 125 to Root NRF 140.

During operations of the wireless network 100, NF 120A may send a discovery request that includes discovery parameters and a preferred locality parameter to the first regional NRF 125A. For example, NF 120A may be a consumer NF that requires the services of a producer NF. If there are no available producer NFs registered with the first regional NRF 125A to satisfy the request, the first regional NRF 125A forwards the discovery request including the discovery parameters and the preferred locality parameter to Root NRF 140. For this example, the preferred locality may be the fifth locality 115E. The preferred locality may be based, in part, on the latency from the locality of the requesting consumer NF (in this case NF 120A).

Upon receiving the discovery request with the preferred locality, Root NRF 140 determines which regional NRF has the most producer NFs in the preferred locality that meet the other discovery parameters. In this example, third regional NRF 125C has two NFs 120M, 120N with the preferred locality 115E that can perform the requested function, and the fourth regional NRF 125D has one NF 120O with the preferred locality 115E that can perform the requested function. In this example, 120M, 120N, and 120O may be producer NFs that perform the desired function requested by the consumer NF 120A. Since third regional NRF 125C has more registered NFs with the preferred locality, Root NF 140 forwards the discovery request to the third regional NRF 125C. It may happen that NFs 120M and 120N are not available to satisfy the request (e.g., the computing systems serving NFs 120M and 120N are down). In such cases, third regional NRF 125C may send the discovery request back to Root NRF 140 with an indication that the discovery request failed. Root NRF 140 may forward the discovery request to the fourth regional NRF 125D because it has the second highest number of NFs with the preferred locality.

As previously mentioned, the locality set triplet mapping may also be used to hierarchically evaluate the regional NRFs 125. For example, Root NRF 140 may first identify all regional NRFs having registered NFs that satisfy the discovery parameters and that match the preferred locality parameter. If the list of regional NRFs 125 that meet those requirements are too small or have too many reroutes (e.g., the NRF is down, the NEs are not functioning well, the requests are overloading that regional NRF or NFs, or the like) Root NRF 125 may then evaluate the regional NRFs for a number of registered NFs that satisfy the discovery parameters and have a locality value that matches any of the primary locality values in the locality set triplet. Next, they are evaluated for locality values that match the secondary locality values, and finally, if needed, they are evaluated for locality values that match the tertiary locality values.

Figure 2:
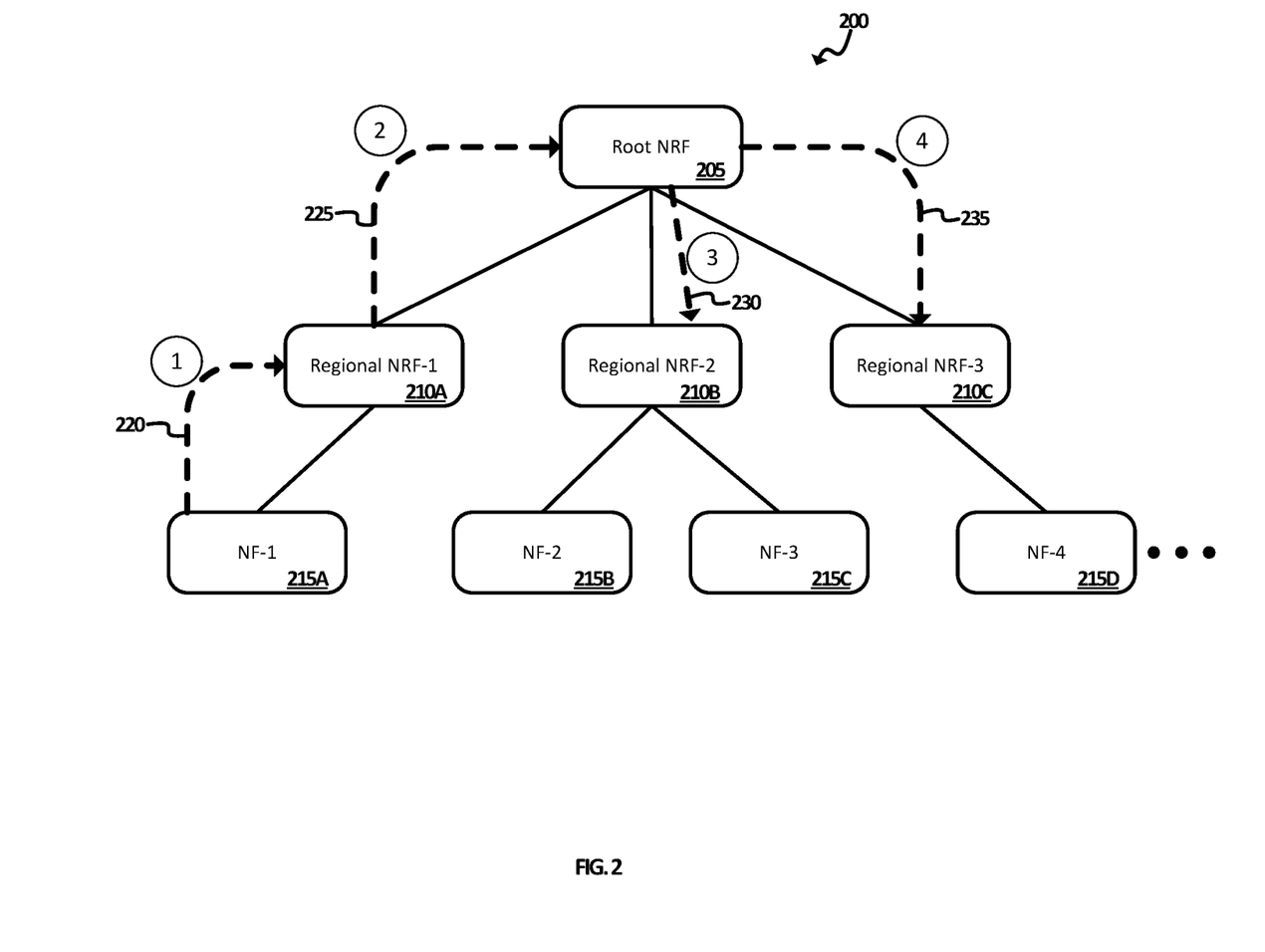
FIG. 2 illustrates an exemplary flow of discovery request routing, according to some embodiments.

FIG. 2 illustrates an exemplary discovery request flow 200 for geographically intelligent discovery request routing. Discovery request flow 200 includes NFs 215, regional NRFs 210, and root NRF 205. The hierarchical diagram illustrated includes limited components for simplicity of description, and it is not meant to limit the scope of the disclosure. Discovery request flow 200 may be provided by wireless network 100, for example.

NFs 215 may be network functions such as NFs 120 as described with respect to FIG. 1. NFs 215 may each have a locality value that represents a geographic location for the NF. The locality value may be a value that represents a data center, a city, a state, or any other geographic designation. NFs 215 may each provide some network function such as session management or policy control. NFs 215 may be served by computing systems within the core network of a wireless network (e.g., CN regions 130 of wireless network 100). The first NF 215A may be in a first locality and may register with a first regional NRF 210A. The second NF 215B and the third NF 215C may be in a second locality and register with the second regional NRF 210B. The fourth NF 215D may be in a third locality and register with the third regional NRF 210C. The registration information provided by each NF 215 includes a locality value representative of the respective NF 215 locality.

Regional NRFs 210 may be the same or substantially the same as regional NRFs 125 as described with respect to FIG. 1. Regional NRFs 210 may be served by computing systems within the core network of the wireless network. Regional NRFs 210 may register their respective NFs 215 that send registration requests. The registration information stored includes the locality value.

Root NRF 205 may be the same as or substantially the same as root NRF 140 as described with respect to FIG. 1. Root NRF may be served by a computing system. Root NRF may have data for NFs 215 that have been synchronized from regional NRFs 210. The data for each NF 215 may include a locality value.

Regional NRF 210A may receive (220) a discovery request from NF 215A. The discovery request may include discovery parameters that indicate, for example, the type of NF needed, and other parameters for meeting the discovery request. The discovery request may also include a preferred locality parameter. Regional NRF 210A may not have a producer NF registered that can satisfy the discovery request. Accordingly, regional NRF 210A may forward (225) the discovery request to Root NRF 205. Root NRF 205 may analyze the discovery request to identify regional NRFs 210 that have NFs 215 registered that can satisfy the discovery request based on the discovery parameters in the discovery request. Root NRF 205 may prioritize the regional NRFs 210 with the most NFs that can satisfy the discovery request based on the preferred locality parameter. For example, regional NRFs 205 having NFs 215 that satisfy the discovery request and meet the preferred locality parameter are ordered based on how many NFs 215 meet the preferred locality parameter. In the example shown, regional NRF 210B has two NFs 215 that can satisfy the discovery request and that match the preferred locality parameter, and regional NRF 210C has one NF 215 that can satisfy the discovery request and that matches the preferred locality parameter. Accordingly, regional NRF 210B is prioritized higher than regional NRF 210C. Based on that determination, Root NRF 205 reroutes (230) the discovery request to the second regional NRF 210B. In the example shown, the second regional NRF 210B may fail to satisfy the discovery request because, for example, NFS 215B and 215C may be unavailable. The second regional NRF 210B may send an indication to Root NRF 205 that the discovery request failed, which may include the discovery request. Root NRF 205 may reroute (235) the discovery request to the third regional NRF 210C based on the prior determination that the third regional NRF 210C has an NF 215D that meets the discovery parameters and matches the preferred locality parameter.

Figure 3A:
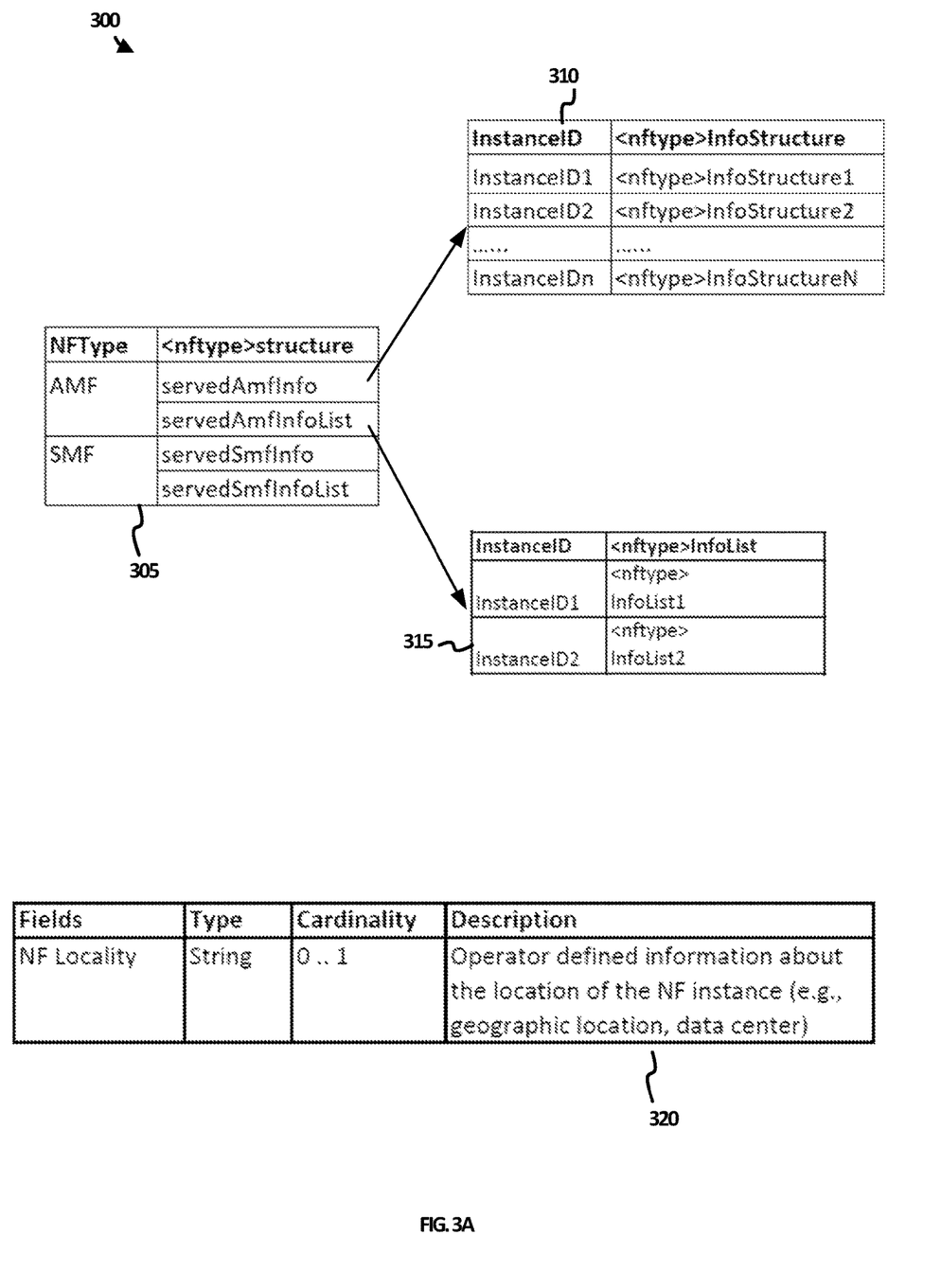
FIGS. 3A and 3B illustrate exemplary is data structures for communicating routing locality preference, according to some embodiments.

FIG. 3A illustrates example message definitions 300 for supporting providing location information such as a locality (e.g., locality value) when synchronizing the regional NRF with the Root NRF. The NRFInfo structure defined in the 3GPP standard (e.g., 3GPP TS 29.510) has optional attributes defined for every NF type (e.g., AMF, SMF, PCF, etc.). The optional attributes are "served<nftype>Info" and "served<nftype>InfoList." As shown in table 305, an example for an AMF is "servedAmfInfo" and "servedAmfInfoList," and an example for a SMF is "servedSmfInfo" and "servedSmfInfoList." The NF types are also defined in the 3GPP standard. The "served<nftype>Info" may include <nftype>InfoStructure data in the messaging as shown in table 310. The "served<nftype>InfoList" may include <nftype>InfoList data in the messaging as shown in table 315. Finally, table 320 shows an example of the CustomInfo structure that has been introduced to encapsulate the locality attribute reported by the NF. The CustomInfo structure can be embedded within the <nftype>InfoStructure. The locality value can be a string value that may be an operator defined value about the location. For example, the value may indicate a geographic location, city, state, region, data center, or any other location.

Figure 3B:
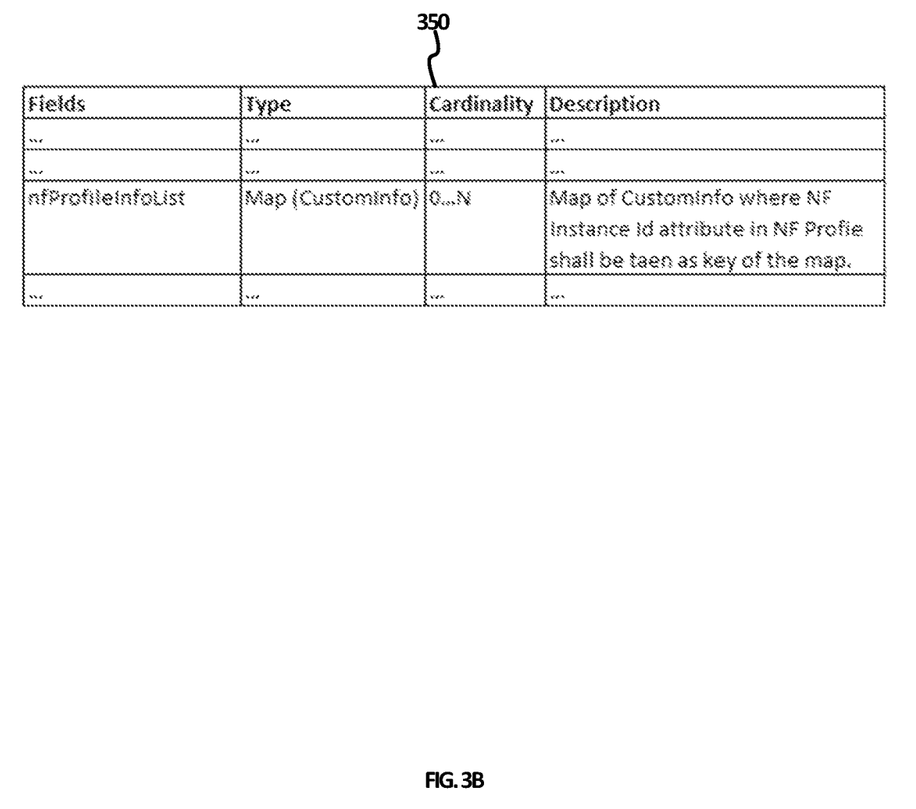

FIG. 3B illustrates another example message definition table 350 for supporting providing location information such as locality (e.g., locality value) when synchronizing the regional NRF with the Root NRF. Table 350 provides an alternative solution over the CustomInfo structure of table 320 as described with respect to FIG. 3A. As shown in table 350, the regional NRF may introduce a MAP type structure referred to as nfProfileInfoList in table 350. The InstanceID of the NF will be the key of the Map message, and the value of the CustomInfo may be the same as described in table 320 of FIG. 3A. In other words, the alternative solution is to provide a Map message as defined in the 3GPP standard that includes the CustomInfo. In this solution, the nfProfileInfoList structure may be embedded within the NF profile of the regional NRF in the NF register/update message to the Root NRF.

Figure 4:
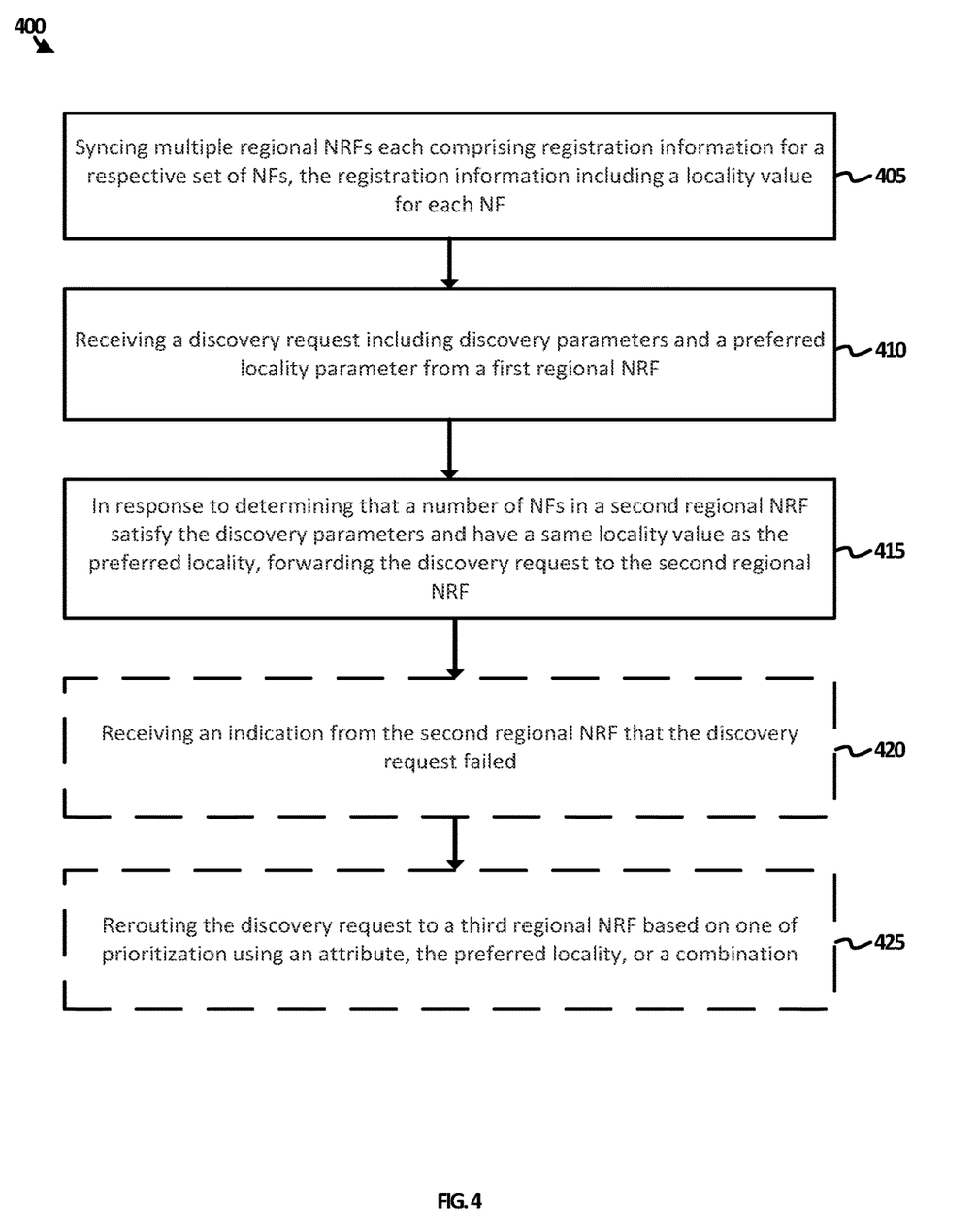
FIG. 4 illustrates a method for routing a discovery request using locality information by a root NRF, according to some embodiments.

FIG. 4 illustrates an example method 400 for routing a discovery request by a Root NRF (e.g., Root NRF 140 as described with respect to FIG. 1 or Root NRF 205 as described with respect to FIG. 2). Method 400 may be performed by a root NRF. Method 400 begins at 405 with syncing multiple regional NRFs each having registration information for a respective set of NFs, the registration information including a locality value for each NF. For example, the regional NRFs 125 as described with respect to FIG. 1 may send a synchronization request to the root NRF 140 to synchronize. In response, the root NRF 140 may synchronize the regional NRF registration information for each NF, including the locality value, by saving the registration information. The locality value may be a geographic designation such as a city, state, region, data center, or the like. Further, the locality value for the NFs may be provided to the root NRF as a CustomInfo structure embedded in an <nftype>InfoStructure message from the regional NRF to the root NRF as described with respect to FIG. 3A. In some embodiments, the locality value for the NFs may be provided to the root NRF as a CustomInfo structure embedded in a Map message from the regional NRF to the root NRF as described with respect to FIG. 3B.

At 410, the root NRF may receive a discovery request including discovery parameters and a preferred locality parameter from a first regional NRF. For example, a consumer NF may send a discovery request to the first regional NRF that includes the discovery parameters and the preferred locality parameter. The first regional NRF may determine it has no registered NFs that can satisfy the discovery request. In response, the first regional NRF may forward the discovery request to the root NRF to reroute to a regional NRF with registered NFs that can satisfy the discovery request. The root NRF may identify the regional NRFs that have registered NFs that can satisfy the discovery parameters. The root NRF may then prioritize the regional NRFs with registered NFs that can satisfy the discovery request and have the preferred locality as their locality value. In some embodiments, the root NRF may prioritize the regional NRFs based on a number of NFs that satisfy the discovery parameters and match the preferred locality. For example, if the fourth regional NRF has 6 NFs that satisfy the discovery parameters, 3 of which match the preferred locality, and the fifth regional NRF has 4 NFs that satisfy the discovery parameters and all match the preferred locality, the fifth regional NRF may be prioritized higher than the fourth regional NRF.

In some embodiments, locality set triplets may be mapped in the root NRF such that a preferred locality may have a mapping to a locality set triplet, which are locations grouped in primary, secondary, and tertiary buckets. In such situations, the root NRF may hierarchically evaluate the regional NRFs first for the number of registered NFs that can satisfy the discovery parameters and having a locality value that matches any locality value in the primary locality bucket. If insufficient regional NRFs are identified, the root NRF evaluates the regional NRFs first for the number of registered NFs that can satisfy the discovery parameters and having a locality value that matches any locality value in the secondary locality bucket. If insufficient regional NRFs are still identified, the root NRF evaluates the regional NRFs first for the number of registered NFs that can satisfy the discovery parameters and having a locality value that matches any locality value in the tertiary locality bucket.

Once the root NRF has identified the best (highest priority) regional NRF to forward the request to, the root NRF forwards the request to the regional NRF for processing at 415.

At optional 420, the regional NRF may send an indication to the root NRF that the discovery request failed. For example, the NFs registered with the regional NRF may be non-responsive or the discovery request may not be completed for some other reason.

At optional 425, the root NRF may reroute the discovery request to a different regional NRF based on prioritization using an attribute, the preferred locality parameter, or some combination. For example, the regional NRFs may be prioritized based on an attribute such as NF priority, available capacity, or the like. Further, the regional NRFs may be prioritized based on having a highest number of NFs that satisfy the discovery parameters and match the preferred locality. In some embodiments, the locality set triplet mapping may be used as described above to determine which regional NRF best meets the discovery request parameters.

Figure 5:
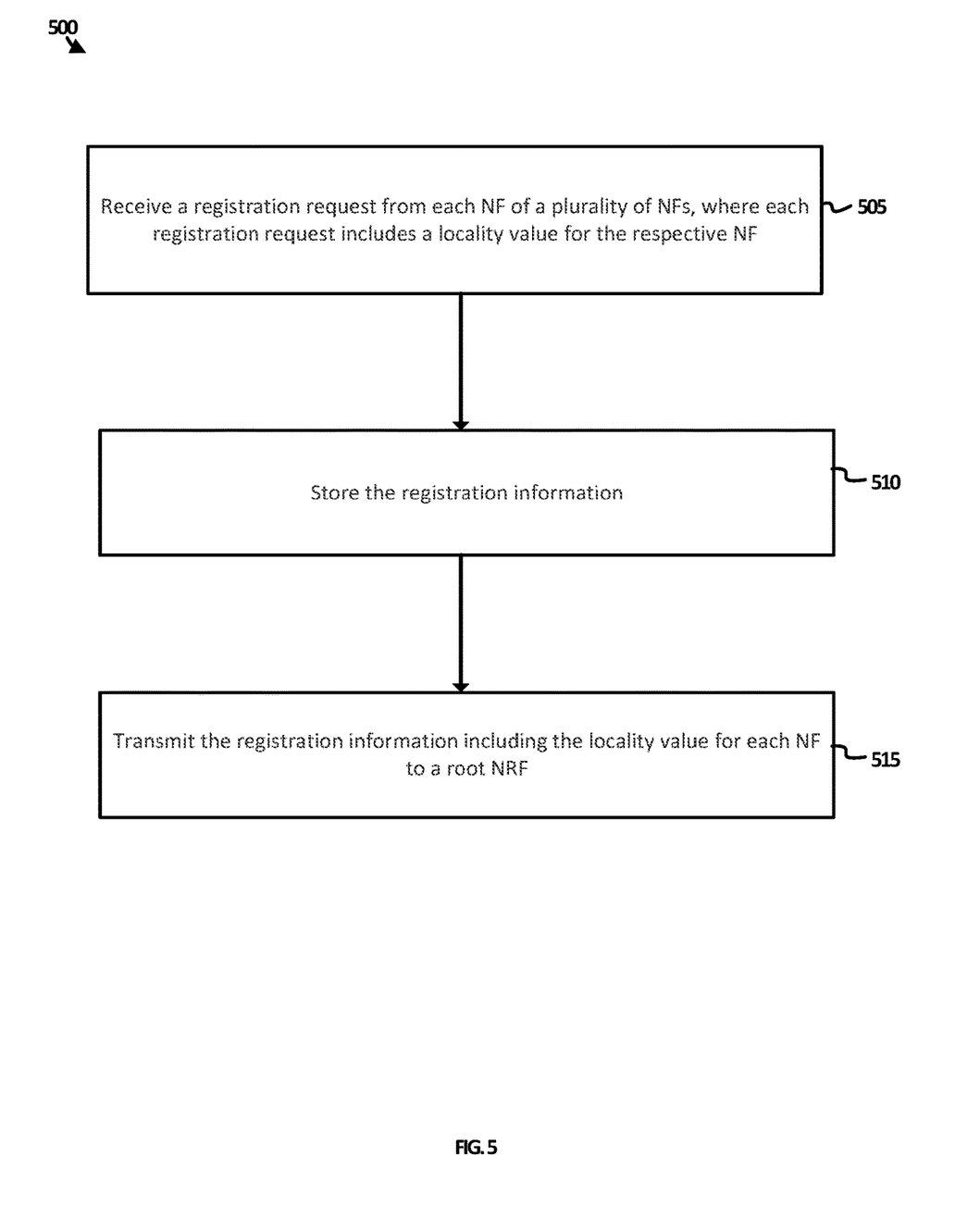
FIG. 5 illustrates a method for synchronizing NF data to a root NRF including locality information by a regional NRF, according to some embodiments.

FIG. 5 illustrates an example method 500 for synchronizing locality information from a regional NRF (e.g., regional NRF 125 as described with respect to FIG. 1 or regional NRF 210 as described with respect to FIG. 2) to a Root NRF (e.g., Root NRF 140 as described with respect to FIG. 1 or Root NRF 205 as described with respect to FIG. 2). Method 500 may be performed by a regional NRF. Method 500 begins at 505 with receiving a registration request from multiple NFs, where each registration request includes a locality value for the respective NF in the registration information for the NF. For example, the locality value may be a value indicating a geographic location such as a city, state, region, data center, or the like.

At 510, the regional NRF stores the registration information for each registered NF including the locality value for the NF. At 515, the regional NRF may transmit the registration information including the locality value for each NF to a root NRF. For example, the regional NRF may send a synchronization request to the root NRF and transmit, together or separately, the registration information for the registered NFs to the regional NRF. The registration information may include the locality value for each NF. For example, the locality value for the NFs may be provided to the root NRF as a CustomInfo structure embedded in an <nftype>InfoStructure message from the regional NRF to the root NRF as described with respect to FIG. 3A. In some embodiments, the locality value for the NFs may be provided to the root NRF as a CustomInfo structure embedded in a Map message from the regional NRF to the root NRF as described with respect to FIG. 3B.

Once received, the root NRF may route discovery requests using the locality values as described in detail throughout this description.

Figure 6:
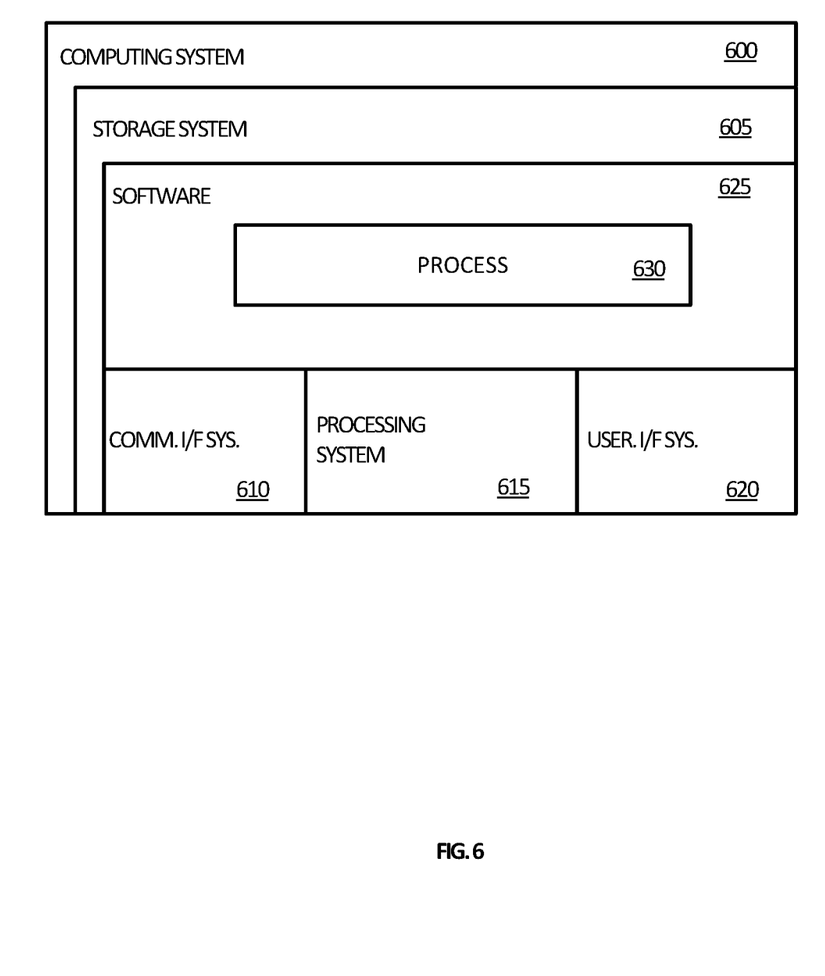
FIG. 6 illustrates an exemplary computing system for implementing the functionality disclosed herein.

FIG. 6 illustrates computing system 600 that is representative of any system or collection of systems in which the various processes, systems, programs, services, and scenarios disclosed herein may be implemented. Examples of computing system 600 include, but are not limited to, desktop computers, laptop computers, server computers, routers, web servers, cloud computing platforms, and data center equipment, distributed computing systems, as well as any other type of physical or virtual server machine, physical or virtual router, container, and any variation or combination thereof.

Computing system 600 may be implemented as a single apparatus, system, or device or may be implemented in a distributed manner as multiple apparatuses, systems, or devices. Computing system 600 may include, but is not limited to, processing system 615, storage system 605, software 625, communication interface system 610, and user interface system 620. Processing system 615 may be operatively coupled with storage system 605, communication interface system 610, and user interface system 620.

Processing system 615 may load and execute software 625 from storage system 605. Software 625 may include and implement process 630, which may be representative of any of the operations for routing discovery requests by a root NRF (e.g., method 400), synchronizing locality information from a regional NRF to a root NRF (e.g., method 500), registering an NF with a regional NF, and the like. Accordingly, computing system 600 may be the node that serves an NF (e.g., NF 120, NF 215), a regional NRF (e.g., regional NRF 125, regional NRF 210), or a root NRF (e.g., root NRF 140, root NRF 205). Computing system 600 may also represent a UE, such as UE 105. When executed by processing system 615, software 625 may direct processing system 615 to operate as described herein for at least the various processes, operational scenarios, and sequences discussed in the foregoing implementations. Computing system 600 may optionally include additional devices, features, or functionality not discussed for purposes of brevity.

In some embodiments, processing system 615 may comprise a micro-processor and other circuitry that retrieves and executes software 625 from storage system 605. Processing system 615 may be implemented within a single processing device but may also be distributed across multiple processing devices or sub-systems that cooperate in executing program instructions. Examples of processing system 615 may include general purpose central processing units, graphical processing units, application specific processors, and logic devices, as well as any other type of processing device, combinations, or variations thereof.

Storage system 605 may comprise any memory device or computer readable storage media readable by processing system 615 and capable of storing software 625. Storage system 605 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 605 may also include computer readable communication media over which at least some of software 625 may be communicated internally or externally. Storage system 605 may be implemented as a single storage device but may also be implemented across multiple storage devices or sub-systems co-located or distributed relative to each other. Storage system 605 may comprise additional elements, such as a controller, capable of communicating with processing system 615 or possibly other systems.

Software 625 (including process 630 among other functions) may be implemented in program instructions may, when executed by processing system 615, direct processing system 615 to operate as described with respect to the various operational scenarios, sequences, and processes illustrated herein. For example, software 625 may include program instructions for registering with a regional NRF (e.g., an NF transmitting a registration request to the regional NRF), registering the NFs (e.g., receiving registration requests, and storing the registration information), synchronizing regional NRFs with root NRFs (e.g., transmitting and/or receiving registration information including locality values for NFs), and routing discovery requests to regional NRFs based at least in part on preferred locality parameters in the discovery requests matching locality values stored at the root NRF for the NFs.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 625 may include additional processes, programs, or components, such as operating system software, virtualization software, or other application software. Software 625 may also comprise firmware or some other form of machine-readable processing instructions executable by processing system 615.

In general, software 625 may, when loaded into processing system 615 and executed, transform a suitable apparatus, system, or device (of which computing system 600 is representative) overall from a general-purpose computing system into a special-purpose computing system customized to act, for example, as a root NRF, a regional NRF, a NF, or the like as described herein. Indeed, encoding software 625 on storage system 605 may transform the physical structure of storage system 605. The specific transformation of the physical structure may depend on various factors in different implementations of this description. Examples of such factors may include, but are not limited to, the technology used to implement the storage media of storage system 605 and whether the computer-storage media are characterized as primary or secondary storage, as well as other factors.

For example, if the computer readable storage media are implemented as semiconductor-based memory, software 625 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 610 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 600 and other computing systems (not shown), may occur over a communication network or networks (e.g., wireless network 100) and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

While some examples provided herein are described in the context of 5G communication networks, it should be understood the systems and methods described herein for geographically intelligent discovery request routing by a root NRF may apply to a variety of other communication networks and environments and their associated systems, such as a 4G communication network. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for routing Network Function (NF) requests, comprising:

syncing, by a root Network Repository Function (NRF), a plurality of regional NRFs, each regional NRF comprising registration information for a respective set of NFs, the registration information comprising a locality value for each NF in the respective set of NFs;

receiving, at the root NRF from a first regional NRF of the plurality of regional NRFs, a discovery request including discovery parameters and a preferred locality parameter; and in response to determining, by the root NRF, that a number of NFs registered with a second regional NRF of the plurality of regional NRFs satisfy the discovery parameters and have a same locality value as the preferred locality parameter, forwarding the discovery request to the second regional NRF.

2. The method of claim 1, further comprising:

determining a second number of NFs registered with a third regional NRF of the plurality of regional NRFs satisfy the discovery parameters and have the same locality value as the preferred locality parameter, wherein the forwarding the discovery request to the second regional NRF is further in response to determining the number of NFs registered with the second regional NRF is larger than the second number of NFs registered with the third regional NRF.

3. The method of claim 2, further comprising:

receiving, by the root NRF, an indication from the second regional NRF that the discovery request failed; and forwarding the discovery request to the third regional NRF.

4. The method of claim 1, wherein the syncing the plurality of regional NRFs comprises:

receiving a synchronization request from each regional NRF of the plurality of regional NRFs; and storing the registration information for each respective set of NFs including the locality value for each NF.

5. The method of claim 1, wherein the first regional NRF, the second regional NRF, and the root NRF each support a 5G Core Network.

6. The method of claim 1, wherein the syncing the plurality of regional NRFs comprises receiving the locality value for each NF as a CustomInfo structure embedded within an <nftype>InfoStructure message.

7. The method of claim 1, wherein syncing the plurality of regional NRFs comprises receiving the locality value for each NF as a CustomInfo structure embedded within a Map message.

8. The method of claim 1, further comprising:
determining a locality set triplet based on the preferred locality parameter, wherein the locality set triplet comprises a primary set of locality values, a secondary set of locality values, and a tertiary set of locality values, and wherein the number of NEs in the second set of NFs have a locality value matching values in the primary set of locality values.

9. The method of claim 1, further comprising:
prioritize, by the root NRF, the plurality of regional NRFs based on an attribute, wherein the forwarding the discovery request to the second regional NRF is further based on a priority of the second regional NRF.

10. The method of claim 1, further comprising:
determining a locality set triplet based on the preferred locality parameter, wherein the locality set triplet comprises a primary set of locality values, a secondary set of locality values, and a tertiary set of locality values,
receiving, by the root NRF, an indication from the second regional NRF that the discovery request failed; and
rerouting the discovery request to a third regional NRF of the plurality of regional NRFs based on hierarchically evaluating the plurality of regional NRFs for a number of NFs having a locality value matching values in the primary set of locality values, matching values in the secondary set of locality values, and matching values in the tertiary set of locality values.

11. A regional Network Repository Function (NRF) system for syncing Network Function (NF) locality information to a root NRF, comprising:
one or more processors; and
a memory with instructions that, upon execution by the one or more processors, cause the one or more processors to:
receive a registration request from each NF of a plurality of NFs, wherein the registration request includes registration information comprising a locality value for the respective NF;
store the registration information for each NF of the plurality of NFs; and
transmit the registration information including the locality value for each NF of the plurality of NFs to the root NRF.

12. The regional NRF system of claim 11, wherein the transmitting the registration information to the root NRF comprises embedding the locality value for each NF as a CustomInfo structure within an <nftype>InfoStructure message.

13. The regional NRF system of claim 11, wherein the transmitting the registration information to the root NRF comprises embedding the locality value as a CustomInfo structure within a Map message.

14. The regional NRF system of claim 11, wherein the regional NRF system supports a 5G Core Network.

15. A root Network Repository Function (NRF) system, comprising:
one or more processors; and
a memory with instructions that, upon execution by the one or more processors, cause the one or more processors to:
receive a synchronization request from each of a plurality of regional NRFs, wherein each synchronization request includes registration information for a respective set of NFs registered with the respective regional NRF from the plurality of regional NRFs, the registration information comprising a locality value for each NF in the respective set of NFs, and
store the registration information for each of the plurality of regional NRFs including the locality value for each NF of each respective set of NFs.

16. The root NRF system of claim 15, wherein the instructions comprise further instructions that, upon execution by the one or more processors, cause the one or more processors to:
receive a discovery request comprising discovery parameters and a preferred locality parameter from a first regional NRF;
identify a second regional NRF from the plurality of regional NRFs based on the second regional NRF having a highest number of registered NFs that satisfy the discovery parameters and having the locality value matching the preferred locality parameter; and
forward the discovery request to the second regional NRF.

17. The root NRF system of claim 16, wherein the instructions comprise further instructions that, upon execution by the one or more processors, cause the one or more processors to:
receive an indication that the second regional NRF cannot complete the discovery request;
identify a third regional NRF from the plurality of regional NRFs based on the third regional NRF having a second highest number of registered NFs having the locality value matching the preferred locality parameter; and
forwarding the discovery request to the third regional NRF.

18. The root NRF system of claim 15, wherein the instructions comprise further instructions that, upon execution by the one or more processors, cause the one or more processors to:
receive a discovery request comprising discovery parameters and a preferred locality parameter from a first regional NRF of the plurality of regional NRFs;
determine a locality set triplet based on the preferred locality parameter, wherein the locality set triplet comprises a primary set of locality values, a secondary set of locality values, and a tertiary set of locality values; and
route the discovery request to a second regional NRF of the plurality of regional NRFs based on hierarchically evaluating the plurality of regional NRFs for a number of NFs that satisfy the discovery parameters and having a locality value matching values in the primary set of locality values, matching values in the secondary set of locality values, and matching values in the tertiary set of locality values.

19. The root NRF system of claim 15, wherein the instructions comprise further instructions that, upon execution by the one or more processors, cause the one or more processors to:
receive a discovery request comprising discovery parameters and a preferred locality parameter from a first regional NRF of the plurality of regional NRFs;
prioritize the plurality of regional NRFs based on an attribute; and
route the discovery request to a second regional NRF of the plurality of regional NRFs based on the prioritization and a determination that the second regional NRF has a highest number of registered NEs that satisfy the discovery parameters and having the locality value matching the preferred locality parameter.

20. The root NRF system of claim 15, wherein the root NRF system supports a 5G Core Network.

* * * * *

UNITED STATES PATENT AND TRADEMARK OFFICE
CERTIFICATE OF CORRECTION

PATENT NO. : 12,356,356 B2
APPLICATION NO. : 18/066025
DATED : July 8, 2025
INVENTOR(S) : Goel et al.

Page 1 of 1

It is certified that error appears in the above-identified patent and that said Letters Patent is hereby corrected as shown below:

In the Specification

In Column 5, Line 8, delete "case" and insert -- ease --, therefor.

In Column 6, Line 17, delete "120K." and insert -- 120K, --, therefor.

In Column 6, Line 19, delete "120P." and insert -- 120P, --, therefor.

In Column 8, Line 51, delete "NEs" and insert -- NFs --, therefor.

In Column 9, Line 60, delete "NFS" and insert -- NFs --, therefor.

In the Claims

In Column 17, Line 10, in Claim 8, delete "NEs" and insert -- NFs --, therefor.

In Column 18, Line 67, in Claim 19, delete "NEs" and insert -- NFs --, therefor.

Signed and Sealed this
Twenty-first Day of October, 2025

John A. Squires
*Director of the United States Patent and Trademark Office*